United States Patent Office 3,391,195
Patented July 2, 1968

3,391,195
FLUORINATED POLYPHENYL ETHERS
Edward S. Blake and George A. Richardson, Dayton, Ohio, assignors to Monsanto Research Corporation, St. Louis, Mo., a corporation of Delaware
No Drawing. Filed Dec. 4, 1963, Ser. No. 328,062
10 Claims. (Cl. 260—613)

ABSTRACT OF THE DISCLOSURE

Claimed as new compounds are derivatives of the polyphenyl ethers wherein the terminal benzene ring of a polyphenyl ether, having from 3 to 8 benzene rings linked through oxygen in the meta position to each other, carries the following substitution: one fluorine atom, three fluorine atoms, or three fluorine atoms and two m-phenoxyphenoxy radicals. The compounds are useful as hydraulic fluids.

---

This invention relates to halogenated ethers and more particularly provides a new and valuable class of partially fluorinated polyphenyl ethers and the method of preparing the same.

The polyphenyl ethers comprise a well-known class of compounds, and those having, say, from 4 to 7 phenyl groups per molecule have been of interest as heat-resistant lubricants and functional fluids; see, e.g., Chemical and Engineering News, Apr. 13, 1959, pp. 64–65; U.S. Patent No. 3,066,852, to E. R. Barnum et al.; U.S. Patent No. 2,940,929, to H. Diamond; and British Patent No. 851,651 to N. V. De Bataafsche Petroleum Maatschappij. As disclosed in said United States patents, the polypenyl ethers may be admixed with antioxidants or with polyphenyl ethers containing alkyl substituents in order to obtain improved compositions for specific purposes.

In order to confer beneficial properties to the polyphenyl ethers, particularly with respect to fire-retardancy, we have attempted to prepare halogen derivatives thereof. However, in most instances introduction of halogen or the trihalomethyl radical into one or more of the benzene rings results in a lowering of the thermal stability (see E. S. Blake et al., J. Chem. Eng. Data, 6 87–98 (1961)). Also, some of the halogenated polyphenyl ethers tend to be crystalline solids, rather than liquids.

According to this invention, uncrystallizable liquids having very good thermal stability are provided when the terminal benzene ring of m-polyphenyl ether having from 3 to 7 phenyl groups is selected from the class consisting of mono-fluorophenyl, pentafluorophenyl and bis(m-phenoxyphenoxy)trifluorophenyl. The terminal benzene ring is either mono-substituted by fluorine or, it is entirely substituted, either by 5 fluorine atoms or by three fluorine atoms and two m-phenoxyphenoxy groups. Such compounds are represented by the general formula:

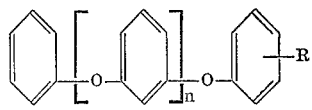

wherein R designates substitution from the class consisting of (1) one fluorine atom, (2) five fluorine atoms, and (3) three fluorine atoms and two m-phenoxyphenoxy radicals, and $n$ is a number of 1 to 5.

One class of compounds of the above formula comprises the mono-fluoro polyphenyl ethers.

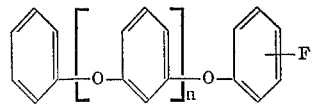

wherein $n$ is a number of from 1 to 5.

Another group of the presently provided compounds are the pentafluorophenyl polyphenyl ethers:

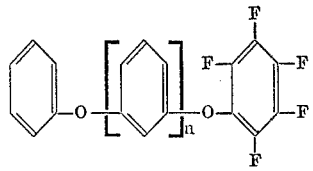

where in $n$ is as defined above.

Still another class of compounds which is provided by the invention comprises the bis(phenoxyphenoxy)trifluorophenyl polyphenyl ethers. They have the formula

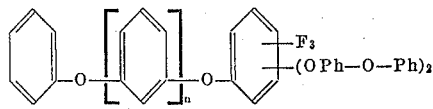

where OPhOPh designates phenoxyphenoxy and $n$ is as above defined.

The presently provided, thermally stable liquids are characterized by having a terminal benzene ring which is either mono-substituted or which is entirely substituted. When it is mono-substituted, the substituent is fluorine. When it is entirely substituted the substitution must be either by only fluorine or by fluorine and two m-phenoxyphenoxy groups. The following series of compounds, where Ph denotes a phenyl ring in meta-position, shows the effect of substitution on fluidity:

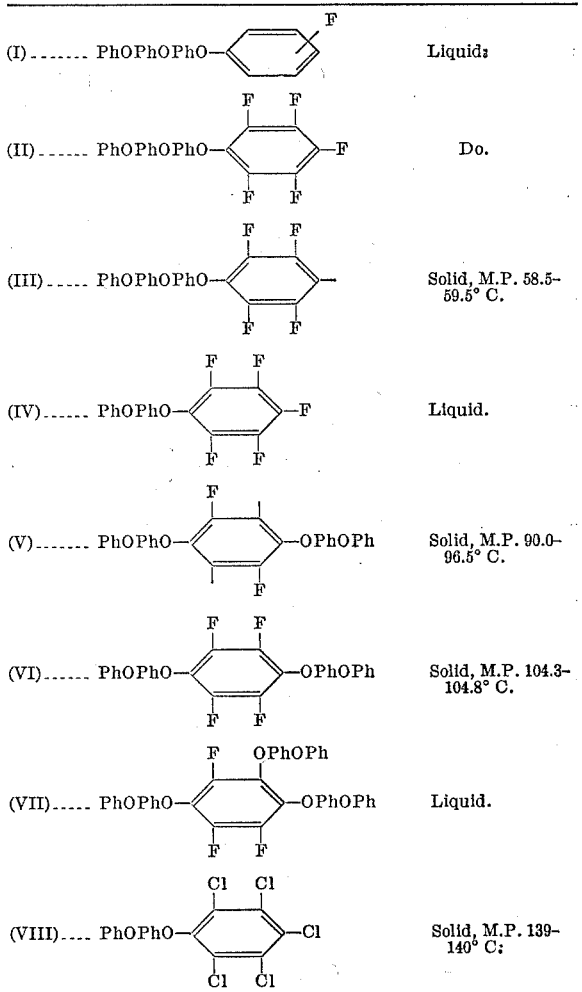

Apparently, the presence of the phenoxyphenoxy radicals as in VII serves to maintain fluidity, whereas a lower number of such group, as in V and VI does not. That fluidity is not merely the function of the number of benzene rings in the molecule is indicated by the fact that although Compound VII and the compound IX) 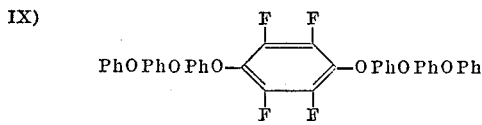

both have seven benzene rings, Compound VII is a liquid whereas Compound IX is a solid, M.P. 135.5–135.8° C.

Examples of normally liquid, thermally stable compounds provided by the invention are the mono-fluoro polyphenyl ethers such as o-, m- or p-fluorophenyl m-phenoxyphenyl ether, m-(o-, m- or p-fluorophenoxy)phenyl m-phenoxyphenyl ether, 1-[m-(o-, m- or p-fluorophenoxy)phenoxy] - 3 - (m-phenoxyphenoxy) - benzene, m-[m-(o-, m- or p-fluorophenoxy)phenoxy]phenyl m-(m-phenoxyphenoxy)phenyl ether, and 1-[m-[m-(o-, m- or p - fluorophenoxy)phenoxy]phenoxy]-3-[m-(m-phenoxyphenoxy)phenoxy]-benzene, as well as the corresponding pentafluoro compounds, e.g., m-[m-(pentafluorophenoxy)phenoxy]phenyl m-(m-phenoxyphenoxy)phenyl ether and 1 - [m - [m - (pentafluorophenoxy)phenoxy]phenoxy]-3-[m-(m-phenoxyphenoxy)phenoxy]benzene.

Examples of the presently provided, normally liquid, heat-resistant bis(m-phenoxyphenoxy) - trifluoro compounds are m-[3,4-bis(m-phenoxyphenoxy)-2,5,6-trifluorophenoxy]phenyl m-phenoxyphenyl ether, m-[2,4-bis(m-phenoxyphenoxy)-3,5,6-trifluorophenoxy]phenyl m-(m-phenoxyphenoxy)phenyl ether and 1-[m-2,3-bis(m-phenoxy) - 4,5,6-trifluorophenoxy]phenyl-3-[m-(m-phenoxyphenoxy)phenoxy]benzene.

In prior art, the polyphenyl ethers have been generally prepared by the Ullmann reaction, wherein nuclear, aromatic bromine, chlorine or iodine is replaced by the phenoxy radical of an alkali metal phenoxide in presence of a catalyst comprising copper or its salts. This type of reaction is useful for the preparation of the presently provided mono-fluoro compounds, since benzene having attached to it one fluorine atom and one atom of bromine, chlorine or iodine reacts with a polyether phenoxide in presence of copper catalyst to replace halogen other than fluorine, thus:

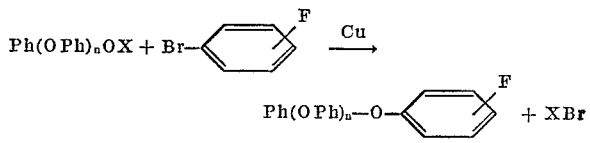

wherein $n$ is a number of from 1 to 5 and X is alkali metal.

An aromatic fluorine atom has been considered to be reactive in the Ullmann reaction, and as shown in the above reaction of bromofluorobenzene, the fluorine remains unattached, whereas the bromine is replaced. We have found, however, that in the nuclearly polyfluorinated aromatic hydrocarbons, from 1 to 3 fluorine atoms are very reactive, probably owing to the inductive effect of the remaining fluorine atoms. As a result, the polyfluorinated benzenes, biphenyls, naphthalenes and acenaphthenes give excellent yields of phenoxy substitution products at relatively low temperatures and even in the absence of the copper catalyst which is required by the Ullmann reaction with other halogen-substituted benzenoid compounds. Reaction readily takes place according to the scheme:

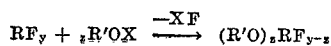

where R is an aromatic hydrocarbon radical which is free of olefinic and acetylenic unsaturation and contains from 6 to 12 carbon atoms, R' is selected from the class consisting of R and R(OR)$_a$OR— where $a$ is zero to 4, $y$ is a number of from 5 to 10, $z$ is a number of from 1 to 3 and X is an alkali metal.

Examples of the useful polyfluorinated aromatic hydrocarbons are pentafluorobenzene, the alkyl-substituted benzenes such as pentafluorotoluene or ethyl-, propyl-, butyl- pentyl- or hexytetrafluorotoluene, hexafluorobenzene, decafluorobiphenyl, octafluorobiphenyl 2,3,4,4',5'-pentafluorobiphenyl, octafluoronaphthalene, α-ethylheptafluoronaphthalene, 3,4,5,6,7,8 - hexafluoroacenaphthene, etc.

The alkali metal phenoxides which react with the polyfluorinated aromatic hydrocarbons with replacement of from 1 to 3 fluorine atoms by an aryloxy radical are, e.g., potassium phenoxide, sodium o-, m- or p-ethylphenoxide, lithium o-, m- or p-hexylphenoxide, potassium o-, m- or p-phenylphenoxide, sodium α- or β-naphthoxide, potassium 3-acenaphthoxide, and the aromatic ether phenoxides such as sodium o-, m- or p-phenoxyphenoxide, potassium m-(p-ethylphenoxy)-o-ethylphenoxide, lithium or potassium β-phenoxy-α-naphthoxide, sodium or rubidium m-(p-phenoxyphenoxyl)phenoxide, sodium or potassium (m-[m-(o-phenoxyphenoxy)phenoxy]phenoxide, etc.

The presently provided pentafluoropolyphenyl ethers are prepared by the reaction of hexafluorobenzene with an alkali metal phenoxide of an appropriate polyether phenol:

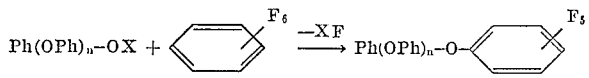

The bis(m-phenoxyphenoxy)trifluoro compounds are obtained by reacting a pentafluorophenyl polyphenyl ether with two molar equivalents of an alkali metal m-phenoxyphenoxide:

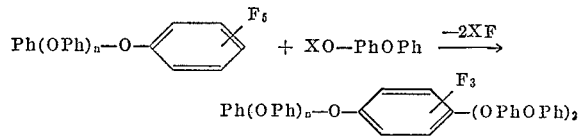

When preparing trifluorotris (m-phenoxyphenoxy)benzene, conveniently, hexafluorobenzene is reacted with three molar equivalents of alkali metal m-phenoxyphenoxide:

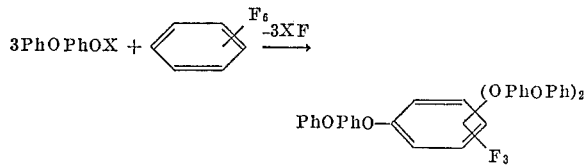

Of the structures shown hereinbefore, I was prepared by the Ullmann reaction from potassium m-(m-phenoxyphenoxy)phenoxide and bromofluorobenzene; II was prepared from hexafluorobenzene and the same potassium phenoxide; III from pentafluorobenzene and the same phenoxide; IV from potassium m-phenoxyphenoxide and hexafluorobenzene; V from dibromodifluorobenzene and two molar equivalents of potassium m-phenoxyphenoxide; VI from hexafluoro benzene and two molar equivalents of potassium m-phenoxyphenoxide; VII from hexafluorobenzene and three molar equivalents of potassium m-phenoxyphenoxide; VIII from hexachlorobenzene and potassium m-phenoxyphenoxide in the presence of copper powder; and IX from hexafluorobenzene and two molar equivalents of potassium m-(m-phenoxyphenoxy) phenoxide.

Other reactions effected with hexafluorobenzene are:

(1)
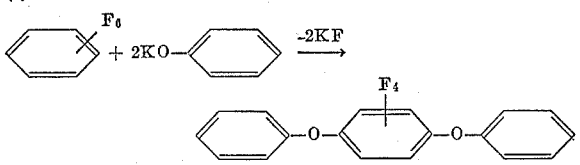

(2)
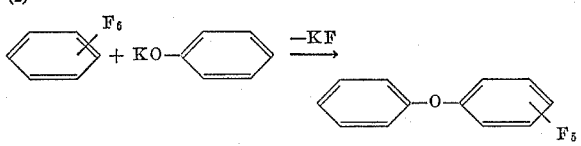

(3)
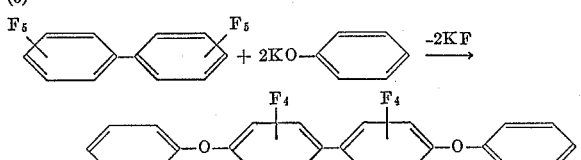

(4)
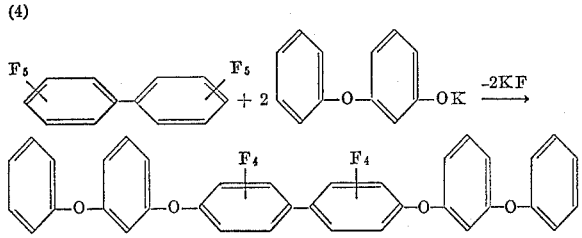

The product of reaction (1) melts at 150.6–151.3° C.; that of (2) at 31.5–32° C.; that of (3) at 112° C., and that of (4) at 108° C. For reactions (1) and (2), stirring of the two reactants in diglyme solution for about 24 hours at room temperature was employed. For reaction (3) the solvent was triglyme and heating at 185° C. was employed, whereas for reaction (4) there was used a temperature of 160° C. with diglyme as solvent.

Reaction of the polyfluorinated aromatic hydrocarbons with the alkali metal aryl oxides takes place by simply contacting the two reactants, advantageously in the presence of an organic liquid solvent or diluent and heating the resulting mixture, e.g., at temperatures of from, say, 60° C. to 200° C., and preferably at reflux until replacement of the fluorine has occurred. Generally the reaction product will be a mixture of compounds in which from one to several fluorine atoms of the polyfluorinated hydrocarbon has been replaced by the aryloxy radical, even though substantially equimolar equivalents of reactants have been employed as starting materials. However, the initially employed ratio will have an effect on the nature of the preponderant product, i.e., when using a 1:1 ratio the product contains a higher proportion of mono-substitution products.

When operating in the presence of an inert, organic liquid solvent or diluents, the following are examples of some useful ones: Ethers of the alkylene or polyalkylene glycols such as ethylene glycol dimethyl ether, diglyme or triglyme, amides such as dimethylacetamide or dimethylformamide, dioxane or dimethyl sulfoxide, etc. When it is desired to operate at reflux, the temperature at which it is desired to conduct the reaction will dictate the choice of solvent. Since reaction time can generally be decreased by increasing reaction temperature, it is advantageous to use a high-boiling material solvent in order to permit high reflux temperatures.

As shown above, the partially fluorinated polyethers which are prepared as described above vary significantly with respect to fluidity. Many of them are solids at ordinary room temperature, with melting point which may exceed 100° C. Such compounds find use as biological toxicants and as heat-transfer agents where fluidity is not a requirement. Of particular interest are those of the compounds which are normally liquid, i.e., those polyphenyl ethers in which the benzene ring is substituted either by one fluorine atom, by five fluorine atoms, or by three fluorine atoms and two m-phenoxyphenoxy radicals. The effect of even the one fluorine atom on fluidity is surprising. Thus, while the unfluorinated ether, m-bis (m-phenoxyphenyl) ether has a melting point of 39–40° C., the terminally mono-fluorinated compounds, e.g., m-(m- or p-fluorophenoxy)phenyl m-phenoxyphenyl ethers have pour points which are well below 0° C. That thermal stability is not thereby substantially effected by the presence of the fluorine atom is evident from the fact that the decomposition point of the fluorine-free compound, i.e., the m-bis(m-phenoxyphenyl) ether is 864° F., whereas that of m-(m-fluorophenoxy)phenyl m-phenoxyphenyl ether is 850° F., and that of the p-fluoro isomer is 837° F.

Owing to their excellent physical properties, the presently provided liquid, partially fluorinated polyphenyl ethers are valuable functional fluids, i.e., they serve as hydraulic fluids, lubricants, heat-transfer media, dielectric materials, gyro fluids, etc. They are particularly valuable, owing to their very good vapor pressure characteristics, as the operative fluids of hydraulic braking up devices. Under current, severe operating conditions, heat build-up within the brake system is frequently encountered. Unless the fluid remains liquid at the high temperatures thus developed, the hydraulic brake system becomes inoperable since the vaporized fluid becomes compressible. The presently provided liquids have boiling points which are well over 400° F., and some of them do not boil until over 600° F. Hence hydraulic systems in which these fluids are used withstand the dangers ensuing from heat build-up. The invention thus provides an improved method of applying pressure to a hydraulic brake, which method comprises employing the present liquid, partially fluorinated polyphenyl ethers as the brake fluid.

The viscosity characteristics of the present liquid, fluorinated polyphenyl ethers also make them of great utility for the transmission of power in a hydraulic system having a pump therein which supplies power for the system, e.g., in a fluid motor comprising a constant- or variable-discharge piston pump which is caused to rotate by the pressure of the hydraulic fluid of the system. The present fluid likewise serves to lubricate the frictional, moving parts of such hydraulic systems.

The liquid, partially fluorinated polyphenyl ethers are useful as the operative fluids in hydraulic systems, generally, i.e., in systems comprising a displaceable member and a displacing force which is transmitted to said member by means of a fluid. While hydraulic systems will contain such elements as pumps, valves, cylinders and pistons, the efficacy of the system necessarily depends upon the fluid, since the fluid must be one which remains liquid under the conditions of use. The present liquid compounds are thus useful as automatic transmission fluids and in hydraulic machinery, generally, e.g., in lifts, hoists, jacks, lock-gates, presses, etc.

The invention is further illustrated by, but not limited to, the following examples.

Example 1

Potassium m-(m-phenoxyphenoxy)phenoxide was prepared by azeotropic distillation of a mixture of 58.4 g. (0.2 mole) of m-(m-phenoxyphenoxy)phenol, 12.4 g. (0.2 mole, 90% pure) of potassium hydroxide and 35 ml. of toluene.

The above-obtained phenoxide was dissolved in 100 ml. of diglyme and added to a solution of m-bromofluorobenzene (35.0 g., 0.2 mole) and copper powder (0.5 g.) in 100 ml. of diglyme over a period of 2.25 hours at 155° C. The whole was stirred for 25.5 hours at 165° C. The solid which formed upon cooling was filtered off, and the diglyme was removed from the filtrate by distillation in vacuo. The residue was taken up in ether and washed with acid, dilute alkali and water to neutrality. Distillation of the washed product gave 44.5 g. (59.5% theoretical yield) of the substantially pure m-(m-fluorophenoxy)phenyl m-phenoxyphenyl ether, B.P. 212° C./0.15 mm., $n_D^{25}$ 1.6094.

Vapor phase chromatography confirmed the homogeneity of the sample. In infrared absorption, the frequencies correspond to those for m-phenyl ether structure, and in nuclear magnetic resonance analyses the chemical shift was 32.7 p.p.m. with a peak width of 30 cps., which is characteristic of the m-fluoro-m-phenyl ether moiety.

The m-(m-fluorophenoxy)phenyl m-phenoxyphenyl ether, a non-crystallizable liquid, was found to have a decomposition point of 850° F., as determined on the isoteniscope and employing substantially the procedure described in E. S. Blake et al., J. Chem. Eng. Data, 6, 87 (1961). The following vapor pressure data were thus determined:

| Vapor pressure, mm. Hg: | Temp., ° C. |
| --- | --- |
| 10 | 271 |
| 100 | 352 |
| 600 | 436 |
| 760 | 448 |

The analogous tetrafluoro-compound, m-(tetra-fluorophenoxy)phenyl m-phenoxyphenyl ether, prepared by reaction of pentafluorobenzene with potassium m-(m-phenoxyphenoxy)-phenoxide in diglyme at 165° C. for 17.5 hours, was a solid, M.P. 58.5–59.5° C.

Example 2

Operating substantially as in Example 1, but using p-bromofluorobenzene instead of the m-bromofluorobenzene of Example 1, there was obtained the substantially pure, normally liquid m-(p-fluorophenoxy)phenyl m-phenoxyphenyl ether, having the B.P. 198° C./0.07 mm., a decomposition point of 837° F. as determined on the isoteniscope by the method referred to in Example 1, and the following vapor pressure characteristics:

| Vapor pressure, mm. ° C.: | Temp., ° C. |
| --- | --- |
| 10 | 276 |
| 100 | 355 |
| 600 | 435 |
| 760 | 447 |

The autogenous ignition temperature of the compound, determined by ASTM D60–7 procedure, was 1155° F. for 0.07 ml. with 13 seconds lag.

Example 3

Potassium m - [m - (m - phenoxyphenoxy)phenoxy] phenoxide was prepared by azeotropic distillation of a mixture of m - [m - (m - phenoxyphenoxy)phenoxy] phenol (27.8 g., 0.073 mole), potassium hydroxide (4.6 g., 0.069 mole) and toluene (50 ml.).

The above prepared phenoxide was dissolved in 100 ml. of diglyme, the solution was added over a 2-hour period to a solution of 27.2 g. (0.146 mole) of hexafluorobenzene in 200 ml. of diglyme at 140° C., and the whole was stirred for 16 hours at 150° C. The precipitate which formed upon cooling was filtered off and diglyme was removed from the filtrate by distillation in vacuo. The residue was taken up in ether and washed with acid, alkali, and finally with water to neutrality. It then distilled to give a fraction B.P. 250° C./0.18 mm., which did not crystallize when cooled to −75° C. It was redistilled to give 20.9 g. (53% theory) of the substantially pure 1 - [m - (pentafluorophenoxy)phenoxy] - 3-(m-phenoxyphenoxy)benzene, B.P. 240° C./0.18 mm., an uncrystallizable liquid. Upon heating it for 18 hours at 675° F. with an absolute pressure of 760 mm. Hg, there was no evidence of decomposition, and the compound was found to have a decomposition point of 783° F. as determined by the procedure described in Example 1.

Example 4

Potassium m-phenoxyphenoxide was prepared by azeotropic distillation of a mixture of 41.2 g. (0.2 mole) of m-phenoxyphenol, 11.2 g. (0.2 mole (of potassium hydroxide and 50 ml. of toluene.

The above-prepared phenoxide was dissolved in 150 ml. of diglyme and a solution of 18.6 g. (0.1 mole) of hexafluorobenzene in 50 ml. of diglyme was added to it, dropwise, over a 30-minute period at 150° C. The whole was then heated, with stirring, at 150°–155° C. for 8 hours. The precipitate which formed upon cooling was filtered off, diglyme was removed from the filtrate by vacuum distillation, and the residue was washed to neutrality, first with acid, then caustic, and finally with water. Distillation of the washed product gave the following fractions.

(1) B.P 160–165° C./0.25 mm.
(2) B.P. 340–355° C./0.3 mm.

Fraction (1) was saved for use in Example 5.

Fraction (2) was dissolved in benzene, the resulting solution was treated successively with charcoal, Attapulgus clay and basic aluminum oxide, and then distilled to give the substantially pure liquid 1,3,5-tris(m-phenoxyphenoxy)trifluorobenzene, B.P. 316–317° C./0.25 mm. and analyzing 73.80% carbon and 3.96% hydrogen, as against 73.68% and 3.97%, respectively, the calculated values for $C_{42}H_{27}F_3O_6$. Nuclear magnetic resonance analysis gave coupling and environment assignments corresponding to two fluorine atoms in the ortho-position with respect to each other and a third fluorine atom in meta or para-position to the other. Accordingly, three fluorine atoms of the hexafluorobenzene had been replaced by reaction with the potassium m-phenoxyphenoxide, resulting in the structure:

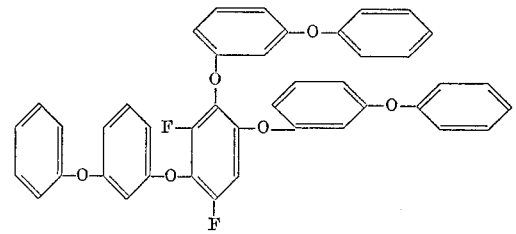

The compound was found to have a decomposition point of 774° F., as determined by the procedure described in Example 1.

Example 5

Fraction (1) of Example 4 was combined with a fraction, B.P. 165–170° C./0.20 mm., which was obtained from a subsequent run, conducted substantially as described in Example 4, except that the order of addition was reversed, i.e., the hexafluorobenzene was added to the phenoxide, and heating at 150–155° C. was conducted. Distillation of the combined fractions through a Todd 42″ Vigreux column at a 10:1 ratio gave the substantially pure pentafluorophenyl m-phenoxyphenyl ether, B.P. 129° C./0.18 mm., $n_D^{25}$ 1.5437, and analyzing 61.45% carbon and 2.59% hydrogen as against 61.37% and 2.57%, the respective calculated values for $C_{18}H_9F_5O_2$.

Infrared absorption showed the following structures:

Aromatic CH at 3080 cm.$^{-1}$
Aromatic C=C at 1590 cm.$^{-1}$
Fluorinated aromatic C=C at 1530 cm.$^{-1}$ and 1495 cm.$^{-1}$
Aromatic ether at 1205 cm.$^{-1}$
Aromatic C—F at 760 and 730 cm.$^{-1}$
Aromatic C—F at 760 and 730 cm.$^{-1}$ The pentafluorophenyl m-phenoxyphenyl ether was found to have the following kinematic viscosities at the temperatures shown below, as determined by American Society for Testing Materials procedure D 445-T (1960).

| Temp., °F.: | Centistokes |
|---|---|
| 100 | 23.39 |
| 210 | 2.735 |
| 400 | 0.6665 |
| 600 | 0.3181 |

Pentachlorophenyl m-phenoxyphenyl ether, prepared substantially by the above procedure except that hexachlorobenzene was used instead of hexafluorobenzene and copper powder was used as a catalyst, is a solid having a melting point at 140° C.

Example 6

Potassium m - (m - phenoxyphenoxy)phenoxide was made by azeotropic distillation of a mixture of m-(m-phenoxyphenoxy)phenol (15.3 g., 0.555 mole), potassium hydroxide (2.8 g., 0.05 mole) and toluene (35 ml.).

A solution of 17.4 g. (0.055 mole) of the phenoxide in 100 ml. of diglyme was added, dropwise, to 9.3 g. (0.05 mole) of hexafluorobenzene in 50 ml. of diglyme at 70-150° C. The solution was stirred for 8 hours at 150° C., and the diglyme was then removed by distilling in vacuo. The residue was washed with mineral acid, caustic and water to neutrality. Distillation of the washed product gave a fraction (A), B.P. 191–193° C./0.25 mm.

The above preparation was then repeated, except that two-fold amounts of reactants were employed. There was thus obtained the fraction (B), 188–191° C./0.2 mm.

Fractions (A) and (B) were combined and distilled through an 11″ Vigreux column, then fractionated twice through a Todd 42″ Vigreux column at 25:1 reflux ratio to give m - (pentafluorophenoxy)phenyl m - phenoxyphenyl ether, B.P. 184° C./0.20 mm., $n_D^{25}$ 1.5711, and analyzing as follows—

Calc'd for $C_{24}H_{13}F_5O_3$: C, 64.87%; H, 2.95%. Found: C, 65.08%; H, 3.16%.

Infrared absorption showed the following structures:

Aromatic CH at ca. 3080 cm.$^{-1}$
Aromatic C=C at 1590 and 1490 cm.$^{-1}$
Fluorinated aromatic C=C at 1510 cm.$^{-1}$
Aromatic ether at 1205 cm.$^{-1}$
Aromatic C—F and meta-substituted polyphenyl ether at 1020–978 cm.$^{-1}$
Meta substituted at 855 cm.$^{-1}$ Nuclear magnetic resonance analysis was confirmatory of a polyphenyl ether with a perfluorinated terminal ring.

The m-(pentafluorophenoxy)phenyl m-phenoxyphenyl ether, an uncrystallizable liquid, was found to have the following kinematic viscosities at the indicated temperatures, as determined by ASTM procedure D 445–T (1960).

| Temp., °F.: | Centistokes |
|---|---|
| 100 | 183.2 |
| 210 | 6.981 |
| 400 | 1.186 |
| 700 | 0.3714 | m - Phenoxyphenyl m - (2,3,5,6 - tetrafluorophenoxy)phenyl ether was also obtained by reacting pentafluorobenzene and potassium m - (m - phenoxyphenoxy)phenoxide in diglyme. It had a boiling point of 206° C./0.20 mm., $n_D^{25}$ 1.5813, and crystallized to the solid, M.P. 58.5–59.5° C.

There was prepared the following compound by reaction of hexafluorobenzene and potassium phenoxide employing substantially the procedure described above.

(I)
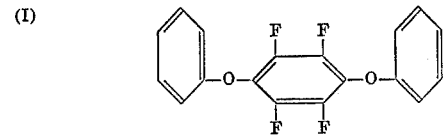

Compound I, i.e., p-diphenoxytetrafluorobenzene was a solid having a melting point of 150.6–151.3° C.

Also prepared was the p-bis(m-phenoxyphenoxy)difluorobenzene:

(II)
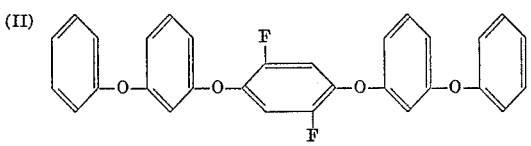

Compound (II) was prepared by the reaction of 2,5-dibromo-1,4-difluorobenzene with potassium m-phenoxyphenoxide in the presence of copper catalyst according to the Ullmann synthesis. This compound was also a solid, having a melting point of 96.0–96.5° C., B.P. 253–4/0.15 mm.

Also, there was prepared another seven-ring phenyl ether having four fluorine atoms, i.e., the compound (III)
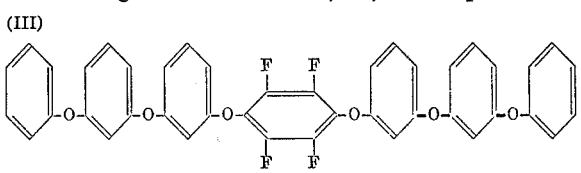

This compound was obtained as a fraction B.P. 335° C./0.3 mm., and a fraction B.P. 335–337° C./0.25 mm. as by-product in the reactions of hexafluorobenzene and potassium m-(m-phenoxyphenoxy)phenoxide described in Example 5 for preparation of the pentafluoro compound of Example 5. Compound III crystallized from heptane, M.P. 135.3–135.8° C.

The liquid, partially fluorinated polyphenyl ethers may be mixed with previously known functional fluids, e.g., the fluorine-free polyphenyl ethers, the trialkyl phosphates or the dialkyl arylphosphonates, so long as the properties of the resulting mixture meet the specifications required of a fluid for the intended use. Care should be observed in preventing an undesired extent of dilution. Generally, at least a major component of the hydraulic fluid or other functional fluid composition should be the partially fluorinated polyphenyl ether. Also, the usual fluid additives, e.g., corrosion inhibitors, antioxidants, viscosity-index improvers, etc.; may be added to the presently provided liquids, although for most purposes it will be found that such additives can be dispensed with.

It is to be understood that although the invention has been described with specific reference to particular embodiments thereof, it is not to be so limited since changes and alterations therein may be made which are within the full intended scope of this invention as defined by the appended claims.

What we claim is:

1. A compound of the formula

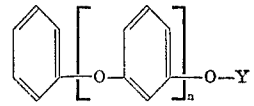

wherein Y is selected from the class consisting of

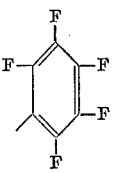

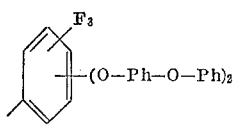

and wherein O—Ph—O—Ph designates the m-phenoxyphenoxy radical and $n$ is an integer of 1 to 5.

2. A compound of the formula

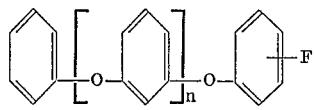

wherein $n$ is an integer of 1 to 5.

3. A compound of the formula

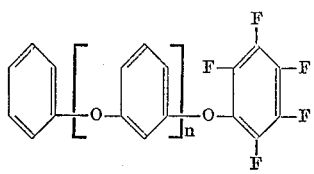

where $n$ is an integer of 1 to 5.

4. A compound of the formula

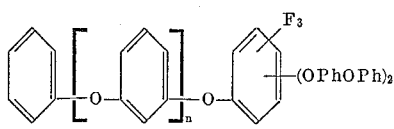

wherein OPhOPh designates the m-phenoxyphenoxy radical and $n$ is an integer of 1 to 5.

5. m-(m - Fluorophenoxy)phenyl m - phenoxyphenyl ether.

6. m - (p - Fluorophenoxy)phenyl m - phenoxyphenyl ether.

7. 1-[m - (pentafluorophenoxy)phenoxy] - 3 - (m-phenoxyphenoxy)benzene.

8. 1,3,5-tris(m-phenoxyphenoxy)trifluorobenzene.

9. Pentafluorophenyl m-phenoxyphenyl ether.

10. m-(Pentafluorophenoxy)phenyl m - phenoxyphenyl ether.

References Cited
UNITED STATES PATENTS

| | | | |
|---|---|---|---|
| 2,137,783 | 11/1938 | Brutton et al. | 252—54 |
| 2,607,192 | 8/1952 | Wood et al. | 60—36 |
| 2,632,995 | 3/1953 | Noe | 60—36 |
| 2,940,929 | 6/1960 | Diamond | 260—613 |
| 3,034,700 | 5/1962 | Hickman | 260—613 |
| 3,118,953 | 1/1964 | Cutukovic | 260—613 |
| 3,135,806 | 6/1964 | Steckler et al. | 260—613 |
| 3,251,890 | 5/1966 | Haszeldine et al. | 260—613 |

FOREIGN PATENTS 886,978  1/1962  Great Britain.

OTHER REFERENCES

Huang, Jour. Chem. Soc. (London) (1958), pp. 3725–3726.

BERNARD HELFIN, *Primary Examiner.*